FIG. 2

Oct. 18, 1966 F. H. COOK ETAL 3,280,401

HYDRAULIC SPEED CONTROL SYSTEM WITH BRAKING

Filed Nov. 15, 1963 5 Sheets-Sheet 3

INVENTORS
FRED H. COOK
THOMAS H. BUSH
BY
*J.C. Wiesley*
ATTORNEY

United States Patent Office 3,280,401
Patented Oct. 18, 1966

3,280,401
HYDRAULIC SPEED CONTROL SYSTEM
WITH BRAKING
Fred H. Cook and Thomas H. Bush, Battle Creek, Mich.,
assignors to Clark Equipment Company, a corporation
of Michigan
Filed Nov. 15, 1963, Ser. No. 323,999
14 Claims. (Cl. 318—258)

This invention relates to vehicle control systems, and more specifically to a vehicle control system which controls vehicle braking, travel speed and forward and reverse travel direction through a single manually operable control element. Such a control system has particular utility in so-called stand-up rider type industrial trucks.

Controls systems which provide for the control of multiple vehicle functions through a single control element are known. For example, see U.S. Patent No. 3,080,019, issued to Russell Hastings, Jr., on March 5, 1963. While previously known control systems of this type have functioned satisfactorily, they have been generally quite complex, difficult to install in a vehicle and troublesome to repair. Consequently, it is a principal object of our invention to provide a control system of the type contemplated which is greatly simplified over previously known types.

Another object of our invention is to provide a control system of the type contemplated which is easy to install in a vehicle and readily repairable.

It has been found that certain vehicle control systems having single manually operated handles which control multiple vehicle functions, including vehicle braking, tend to be somewhat confusing to the vehicle operator, and therefore unsafe because it is necessary to turn the control handle in one direction in order to brake the vehicle while traveling in a forward direction and to turn the control handle in the opposite direction in order to brake the vehicle while traveling in a reverse direction. It is therefore, another object of our invention to provide a safer and less confusing operator control means wherein the control handle is moved in the same direction to apply the vehicle brakes irrespective of the direction of travel of the vehicle.

Still another object of our invention is to provide in vehicles of the type contemplated an improved master cylinder and control handle assembly wherein the control handle is movable in a U-shaped pattern.

In carrying out our invention in a preferred embodiment thereof we provide in an electric industrial truck having a pair of drive motors, a manually operable control handle movable in a U-shaped pattern and connected to a master fluid actuator so that movement of the control handle in a given direction causes the actuator to generate or release fluid pressure. Connected to the master fluid actuator is a pair of brake actuators which release normally applied brakes associated therewith when a first pressure is generated by the master fluid actuator. Also connected to the master fluid actuator in common with the brake actuators are a plurality of pressure responsive switches and an actuator for compressing a variable resistor, of the carbon pile type as disclosed in circuit with the drive motors. The pressure responsive switches are connected operatively in circuit with the drive motors so that closing of a first pressure responsive switch energizes the circuit of the drive motors and allows an increase in the drive motor current as the variable resistor is compressed. Following full compression of the resistor a second one of the pressure responsive switches closes in order to energize a circuit which by-passes the resistor for higher speed operation. Finally, a third one of the pressure responsive switches closes which causes the drive motors to be reconnected from a series to a parallel relation. A hydraulic time delay and a fluid accumulator are also disposed in the system as disclosed herein to control the rate of fluid pressure build-up at the pressure responsive switches and at the brake actuators. There is also provided an on-off valve circuit which prevents a build-up of pressure fluid in the system unless the operator is depressing a so-called dead man brake pedal, thereby preventing vehicle movement and insuring that the vehicle brakes are applied whenever an operator is not on the vehicle in position to control the vehicle.

The above and other objects, features and advantages of our invention will become more readily apparent to persons skilled in the art from the following description when taken in conjunction with the accompanying drawing wherein.

Figure 1:
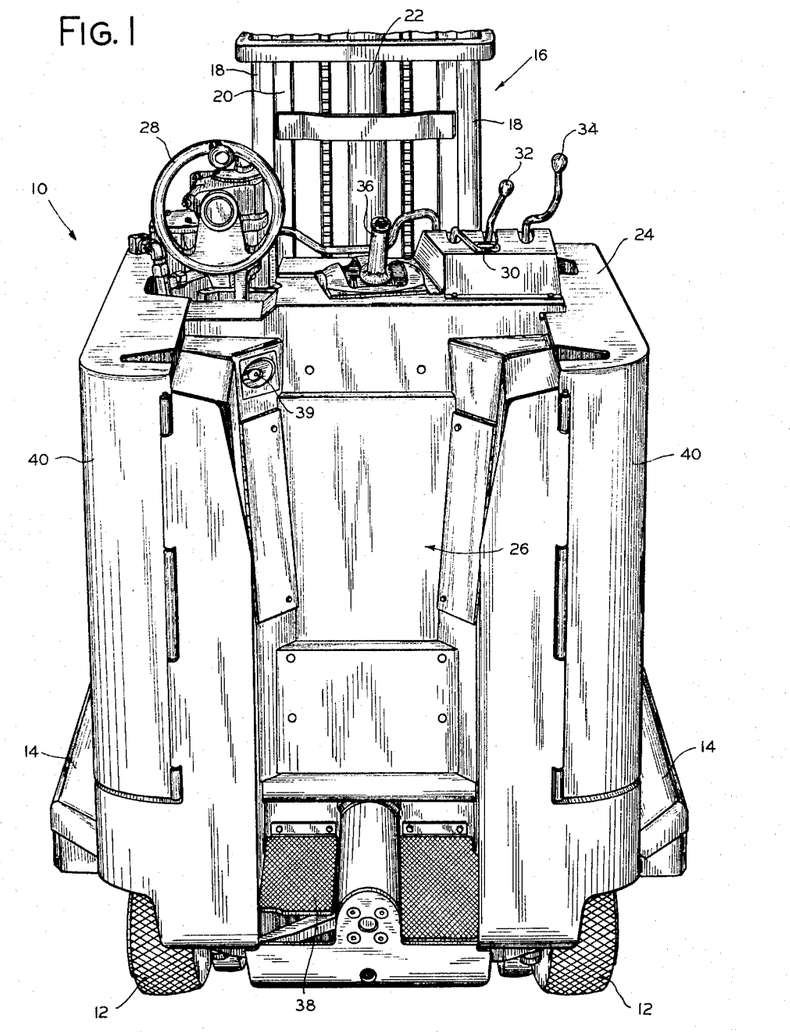
FIGURE 1 is a perspecive view taken from the rear of an industrial truck which embodies our invention.

Referring now to FIG. 1, the reference numeral 10 denotes a stand-up rider type electric lift truck which includes a body 24 supported at the rear thereof by a pair of drive-steer wheels 12 and supported at the front thereof by a pair of trail wheels, not shown, which are mounted at the forward ends of a pair of forwardly extending outrigger arms 14 which are secured, as by welding, to body 24 at the front end thereof. Located between outrigger arms 14 and forwardly of body 24 is a load handling telescopic upright assembly 16 of known construction of which only a portion is shown. The upright assembly includes a pair of fixed channel members 18 within which an inner slide 20 is telescoped for vertical reciprocal movement. Mounted upon the inner slide 20 is a fork carriage, not shown, which is actuatable vertically therealong. The inner slide and carriage members are actuated vertically in respect of each other and of fixed channel members 18 in a well-known manner by means of a single-acting hydraulic motor 22 and a chain and sprocket assembly. The upright assembly 16 is mounted on the outrigger arms 14 by means of roller assemblies so as to be movable horizontally along the outrigger arms from a position adjacent the front of body 24 to a position adjacent the outer or forward ends of the outrigger arms in order that a palletized load resting on the ground or floor over which the truck 10 is operating may be engaged by the fork tines carried by the fork carriage without interference from outrigger arms 14, and then elevated slightly above the outrigger arms an retracted to a carrying position adjacent the front end of body 24. A lift truck and upright construction of the type generally described above is disclosed in greater detail in U.S. Patent No. 3,080,019, in the name of Russell Hastings, Jr.

Truck 10 includes an operator's station 26 located at the rear of the truck. Located conveniently to the operator at the operator's station 26 is a steering control wheel 28 which is operatively connected by means of a power steering system, not shown, to a pair of drive-steer wheels 12. Also located at the operator's station is a bank of three control levers 30, 32 and 34 which actuate, respectively, hydraulic motor 22 for raising and lowering the carriage and inner slide of upright assembly 16, hydraulic means for tilting upright 16 about a horizontal axis disposed transversely of the truck, and hydraulic means for actuating upright assembly 16 longitudinally between a position adjacent body 24 and a position adjacent the outer ends of outrigger arms 14. Located at operator's station 26 between steering control wheel 28 and the bank of control levers is a control handle 36 which is a part of our invention. On the floor of operator's station 26 is a foot pedal 38 upon which the operator stands while operating truck 10 which serves as part of a dead man brake, i.e., when pedal 38 is not depressed the truck brakes are applied. Also located at operator's station 26 is a key operated on-off switch 39.

Located within side wall compartments 40 at each side of operator's station 26 is a pair of electric motors (FIG. 3), each of which individually drives one of drive-steer wheels 12 and is powered by a battery 41.

Figure 2:
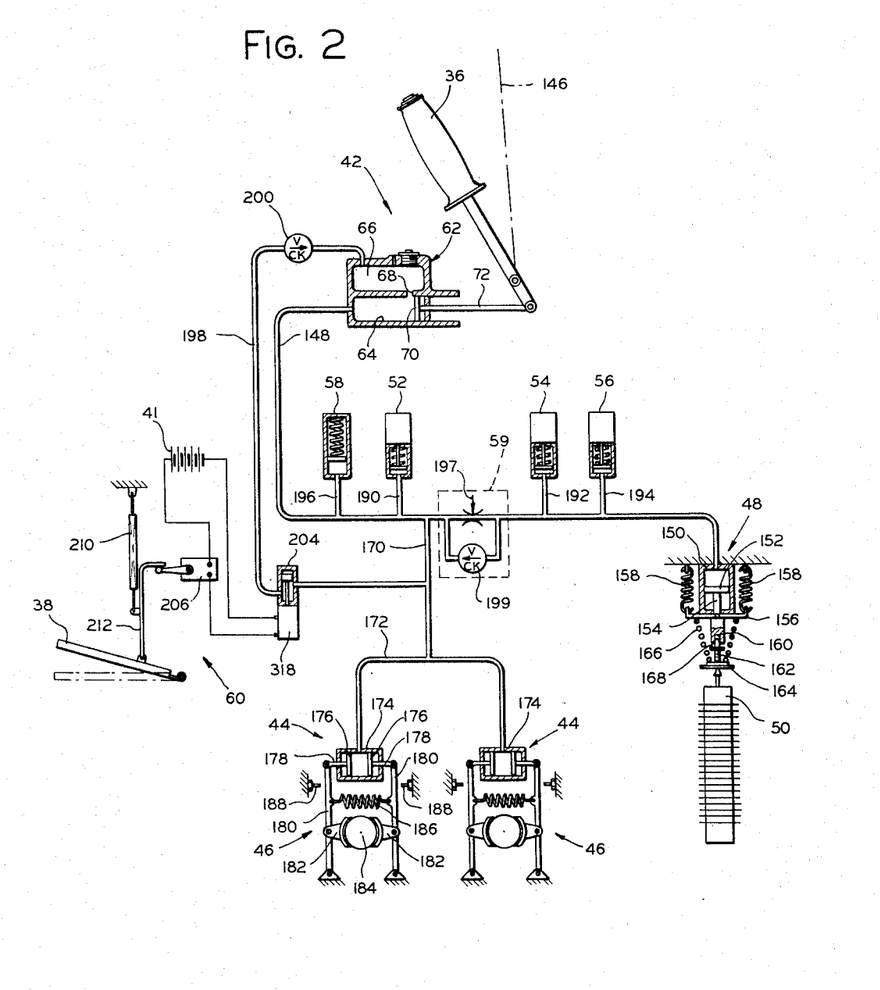
FIGURE 2 is a schematic showing of the fluid circuitry and related components of our invention.
Figure 4:
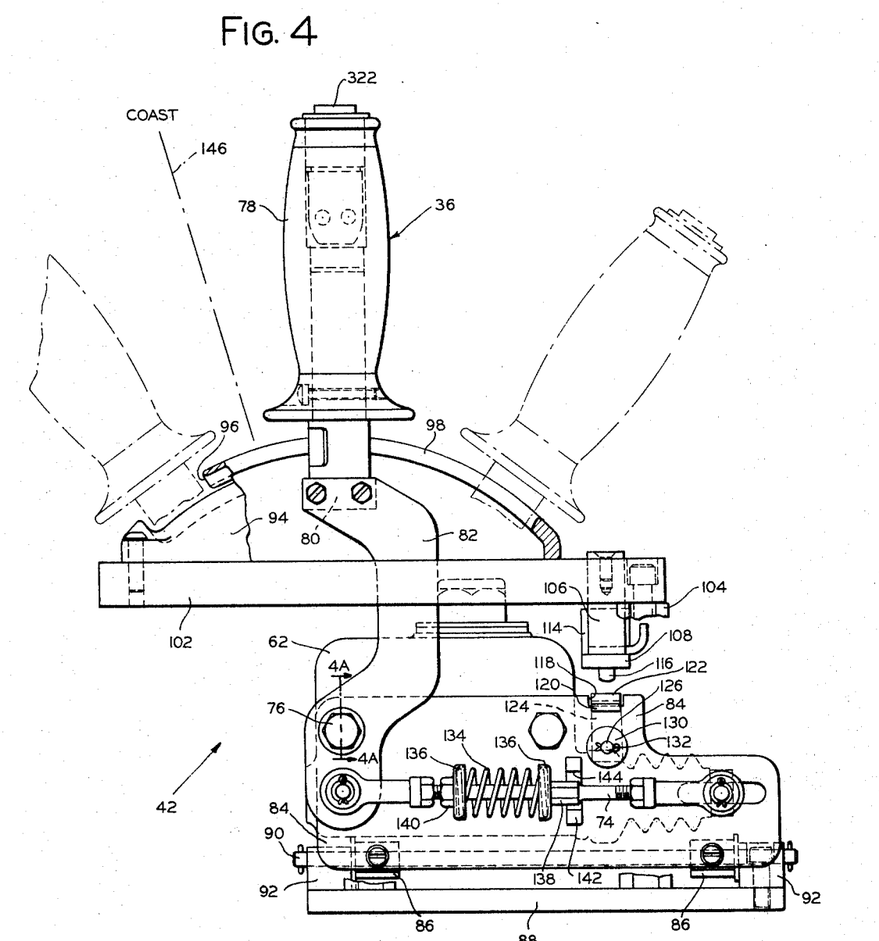
FIGURE 4 is a side elevation on an enlarged scale showing the detaails of the master fluid actuator and control handle assembly which forms a part of our invention.
Figure 5:
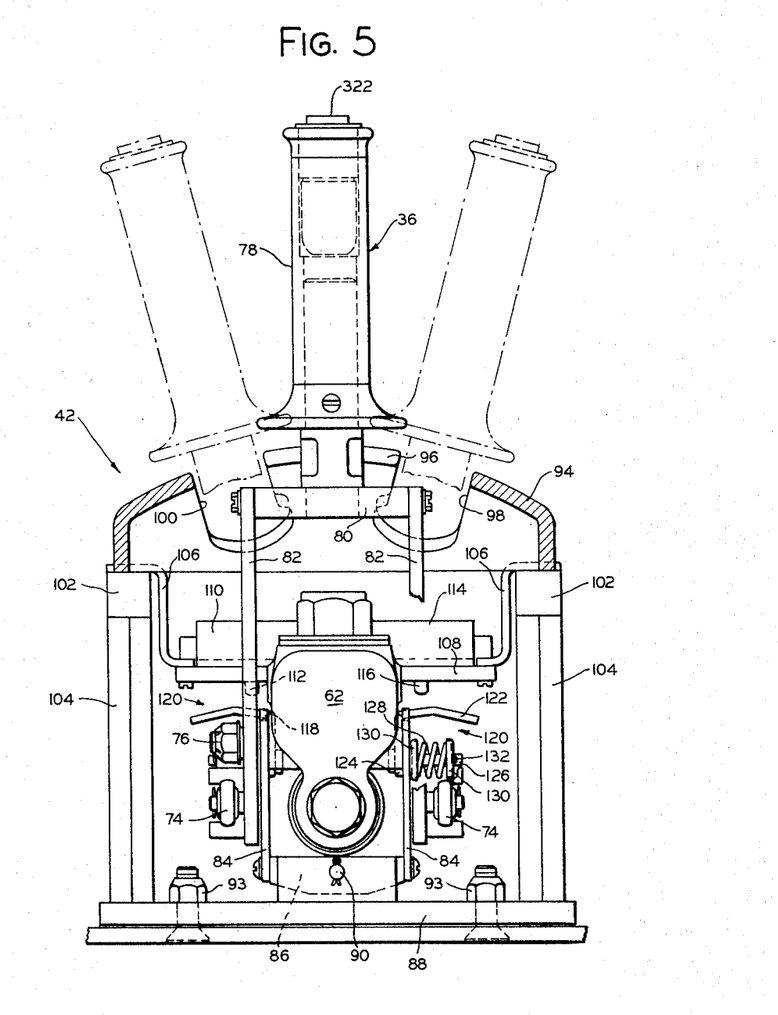
FIGURE 5 is an end view of the assembly shown in FIG. 4 with certain parts removed in the interest of clarity.

Referring now to FIGS. 2, 4 and 5, the hydraulic portion of the control system includes a master fluid actuator and control handle assembly 42, a pair of double piston and cylinder type fluid actuators 44 for releasing a pair of normally-applied spring-actuated brakes 46, a piston and cylinder type fluid actuator 48 for compressing a carbon pile variable resistor 50, three fluid pressure responsive switches 52, 54 and 56, a fluid pressure accumulator 58, a fluid time delay 59, and a dead man brake 60 for applying brakes 46 when, for example, an operator is not occupying operator's station 26.

Figure 4A:
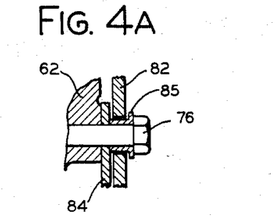
FIGURE 4A is a fragmentary sectional view on an enlarged scale taken along line 4A—4A of FIG. 4 and showing the pivotal connection of the control handle to the actuator body.

Actuator assembly 42 includes an actuator body 62 having a bore 64 therein and a fluid reservoir portion 66 which communicates with bore 64 by means of a fluid port 68. Slidably disposed in bore 64 is a piston 70 to which a piston rod 72 is connected and extends through one end of body 62. Connected to the outer end of piston rod 72 is a pair of connecting links 74 which are disposed on opposite sides of actuator body 62 and extend longitudinally thereof, being connected at their other ends to the lower portion of control handle 36 which is bifurcated and straddles actuator body 62. (It will be noted that in FIG. 2 piston rod 72 is shown schematically connected directly to control handle 36; however, in practice such is not the case as there is intervening linkage as described above. It is illustrated in this manner in FIG. 2 in order to simplify the figure and more clearly show the details of actuator body 62.) Pivotal movement of control handle 36 causes sliding movement of piston 70 within bore 64 whereby fluid pressure is generated or relieved, depending upon the direction of control handle movement. Control handle 36 includes a grip portion 78 which is attached to a transverse bar 80 from which a pair of side plates 82 depend and form with bar 80 a bifurcated lower handle portion which is pivotally connected to a pair of longitudinally extending plates 84 disposed on each side of actuator body 62 by means of a nut and bolt fastener 76 which passes through side plates 82, plates 84 and actuator body 62. Fastener 76 also carries a pair of bushings 85 (FIG. 4A) so that plates 84 can be clamped against actuator body 62 without restricting pivotal movement of plates 82. Plates 84 also are connected by a pair of longitudinally spaced cross bars 86 to form a cradle for supporting actuator body 62 and control handle 36. The cradle is pivotally connected to an assembly base plate 88 by means of a pin 90 which extends through cross bars 86 and a pair of bearing blocks 92 connected to plate 88. Consequently, control handle 36 is pivotal about an axis defined by pin 90 as well as about an axis defined by nut and bolt fastener 76. At this point, it will be noted that assembly 42 is fastened to a suitable portion of the truck frame by means of nut and bolt fasteners 93 which pass through plate 88.

Movement of control handle 36 is confined to a U-shaped pattern by means of a U-shaped opening cut in a cover plate 94 and through which control handle 36 extends. The U-shaped opening includes a bight portion 96 and a pair of leg portions 98 and 100. Cover plate 94 is supported by a pair of support bars 102 which in turn are supported by four vertically extending corner posts 104, three of which are shown.

Supported from support bars 102 by a pair of hanger straps 106 is a switch mounting plate 108 which extends transversely of the axis defined by pin 90 and about which actuator body 62 pivots. Mounted on plate 108 in transversely spaced relation is a pair of normally-open microswitches 110 and 114 having actuator buttons 112 and 116, respectively, disposed to extend downwardly below plate 108. Switches 110 and 114 control the forward and reverse travel direction, respectively, of truck 10, as will be explained in more detail below.

Referring back now to the pair of longitudinal plates 84, each plate has a notch 118 in the top edge thereof which receives a substantially L-shaped bar 120 having a leg 122 which extends outwardly from the respective plate 84 and a leg 124 which extends downwardly along the inner side of plate 84. Each bar 120 is held in position by means of a headed pin 126 which extends outwardly through leg 124 and the adjacent plate 84 and is held in place by a compression spring 128 disposed between a pair of retainer members 130, the outer retainer member being held on pin 124 by a cotter pin 132. From the above description it will be seen that the connection of bars 120 to the respective plates 84 permits legs 122 thereof to pivot downwardly about notch 118 by compressing springs 128 so that excessive sidewise movement of actuator body 62 will not damage switches 110 and 114.

From the above description, it will now be apparent that movement of control handle 36 toward the right as shown in FIG. 5 causes actuator body 62 to pivot about pin 90 with the result that leg 122 adjacent actuator button 112 is brought into contact with it, thus causing switch 110 to close with the result that the drive motors are conditioned for forward drive. Similarly, movement of handle 36 to the left as shown in FIG. 5 brings leg 122 adjacent button 116 into contact with it to cause switch 114 to close, and thus condition the drive motors for reverse drive. At this point it will be seen that rightward or leftward movement of control handle 36 from a centered position as shown in FIG. 5 has no effect upon the fluid contained in cylinder 64, but serves merely to selectively close switch 110 or switch 114, clockwise or forward movement of control handle 36 as shown in FIGS. 2 and 4 causing fluid pressure to be generated in cylinder 64.

Fluid pressure generated in the control system in a manner which will become clear hereinafter tends to force control handle 36 to the leftmost or rearward position as shown in FIG. 4; however, control handle 36 is prevented from assuming such a position by the action of a pair of compression springs 134, one of which is shown, each of which is held between a pair of cup-shaped retainer members 136 through which one of rods 74 extends. Each compression spring 134 and the associated pair of retainer members are disposed between an enlarged portion 138 and a nut 140 on the respective rod 74. Adjacent the enlarged portion of each rod 74 is an outwardly extending dog 142 which has a notch 144 through which the rod 74 extends. Thus, pressure fluid generated by the control system tends to pivot handle 36 to the left as shown in FIG. 4 until each retainer member 136 comes into contact with the adjacent dog 142, at which point control handle 36 is disposed along axis 146. With control handle 36 in this position the control system is conditioned for coast operation, i.e., the truck brakes are released and the drive motors are not energized. In order to move control handle 36 further to the left from its position along axis 146 an operator must exert sufficient force to overcome compression springs 134. Consequently, whenever control handle 36 is located at any position along either leg 98 or 100 of the U-shaped opening in cover plate 94 and the operator releases it, the control handle 36 will move to the coast position indicated by axis 146.

Connected to one end of bore 64 is a fluid conduit 148 (FIG. 2) which is connected at the outer end to a cylinder member 150 of actuator 48 which includes a piston 152 slidably disposed within cylinder member 150. Connected to piston 152 is a piston rod 154 that extends outwardly through one end of cylinder 150. Connected to piston rod 154 is a cross-bar 156 to the ends of which a pair of tension springs 158 are attached. The ends of springs 158 opposite cross-bar 156 are attached to a frame portion of the truck as is cylinder member 150. Consequently, piston 152 is urged by springs 158 toward the head end of cylinder member 150 to displace fluid therefrom. The outer end of piston rod 154 has an opening 160 therein which receives the end of a rod 162 in sliding telescopic relation. The end of rod 162 opposite a opening 160 carries a heat shield member 164 to protect actuator 48 from the heat dissipated by carbon pile 50. Further, heat shield 164 is held in abutting relation with carbon pile 50 by means of a compression spring 166 disposed between heat shield 164 and cross-bar 156. Spring 166 holds carbon pile 50 under slight compression, for example, a force of one-half pound, in order to keep the individual disks of the carbon pile in contact with each other so that arcing and the like is prevented. Rod 162 also carries an annular stop member 168 in fixed relation thereon and against which piston rod 160 pushes when actuator 48 is subjected to sufficient fluid pressure to move piston 152 downwardy as shown in FIG. 2 against the tension of springs 158.

Connected to fluid conduit 148 by means of a branch conduit 170 and a common connecting conduit 172 are actuators 44. Each actuator 44 includes a cylinder member 174 connected to the truck frame and within which is slidably disposed a pair of opposed pistons 176. Connected to each piston 176 is a piston rod 178 which extends outwardly through cylinder 174. Each piston rod 178 is connected to a brake actuator lever arm 180 which is pivotally connected at the other end thereof to a suitable portion of the truck frame. Connected to each arm 180 is a brake shoe 182 which cooperates with a brake drum 184 which is connected to one of the drive motors. The pair of arms 180 associated with each brake drum 184 are actuated toward each other by means of a tension spring 186 connected between them. Movement of arms 180 away from each other is limited by a pair of adjustable stop members 188 connected to a portion of the truck frame. It will now be clear that brakes 46 are normally applied by means of springs 186 holding brake shoes 182 in frictional engagement with brake drums 184 and that the brakes are released by pressurizing actuators 44 to cause each pair of pistons 176 to move apart against the bias of springs 186 to the limit determined by stop members 188 whereby brake shoes 182 are moved away from frictional engagement with brake drums 184.

Also connected to fluid conduit 148 are fluid pressure responsive switches 52, 54 and 56 which are connected thereto by means of branch conduits 190, 192 and 194, respectively. The connection of switches 52, 54 and 56 in the electric circuitry will be explained shortly.

Accumulator 58 also is connected to fluid conduit 148 by means of a branch conduit 196. The purpose of accumulator 58 is to permit substantial movement of control handle 36 after actuators 44 have been expanded outwardly against stop 188. Without an accumulator in the hyraulic circuit the pressure changes in conduit 148 would be substantial with relatively slight longitudinal movement of control handle 36, and thus result in an oversensitive operator control tending to make truck speed selection difficult and to cause jerky operation of the truck.

Disposed in conduit 148 between switch 52 and switch 54 is the time delay unit 59. Unit 59 includes an adjustable orifice 197 and a one-way ball check valve 199 for by-passing orifice 197 when fluid fllow is toward assembly 42. Unit 59, in conjunction with accumulator 58, serves to limit the rate at which fluid can flow through conduit 148 toward actuator 48 downstream of orifice 197, and thus limits the rate at which fluid pressure builds up to actuate switches 54 and 56 and actuator 48. The result of thus limiting the rate of fluid pressure build-up is twofold: First, the rate at which the truck can accelerate in either direction is limited, and secondly, plugging of the drive motors is prevented under normal operating conditions upon manipulation of hand 36 to reverse the direction of truck travel because a predetermined period, for example .75 second, elapses before sufficient fluid pressure can be generated at actuator 48 to compress the carbon pile and energize the drive motors to operate in a reverse direction. In addition, it will be noted that the construction of the control handle and actuator assembly 42 requires that the control effects a braking of the truck by the operation of actuators 44 prior to energizing the drive motors to operate the truck in an opposite direction. Consequently, the truck will stop before the drive motors begin to propel it in an opposite direction, and plugging of the drive motors is thereby prevented.

It will be noted that switches 52, 54 and 56 and actuators 44 and 48 are all operated against the bias of various springs. These springs are selected so that as the fluid pressure in conduit 148 increases the actuators 44 are first extended outwardly against stops 188 and then switch 52 is closed. Thereafter actuator 48 extends against the bias of springs 158 until carbon pile 50 is completely compressed, following which switch 54 is closed and then switch 56 is closed. The purpose of the above sequence of operation of switches and actuators will be explained below in the description of the operation of the electrical portion of the control system.

Finally, the hydraulic portion of the control system includes a fluid pressure conduit 198 which communicates reservoir 66 with conduit 170. Conduit 198 could be arranged to communicate with any other portion of the hydraulic circuitry downstream of bore 64 and upstream of time delay unit 59 without changing the mode of operation thereof. Disposed in conduit 198 is a ball check valve 200 which prevents reverse flow of fluid therein from reservoir 66 toward conduit 170, and a normally open valve 204 which is actuated to close by a solenoid 318. The solenoid 318 is connected in circuit with battery 41 and the energization thereof is controlled by a normally-off switch 206. Switch 206 is actuated to close by means of a foot pedal 38 which is biased to a raised position by a tension spring 210 connected at one end to a portion of the truck frame and at the other end to a link 212 which is in turn pivotally connected to pedal 38 and which engages switch 206 so that when pedal 38 is depressed switch 206 is actuated to its on position. The above-described apparatus serves as a deadman safety control. That is, in order for fluid pressure to be built up in the control system pedal 38 must be depressed to energize solenoid 318 to close valve 204, and thus close off communication with reservoir 66 through check valve 200. Otherwise, movement of control handle 36 would have no effect because no fluid pressure will be built up.

Figure 3:
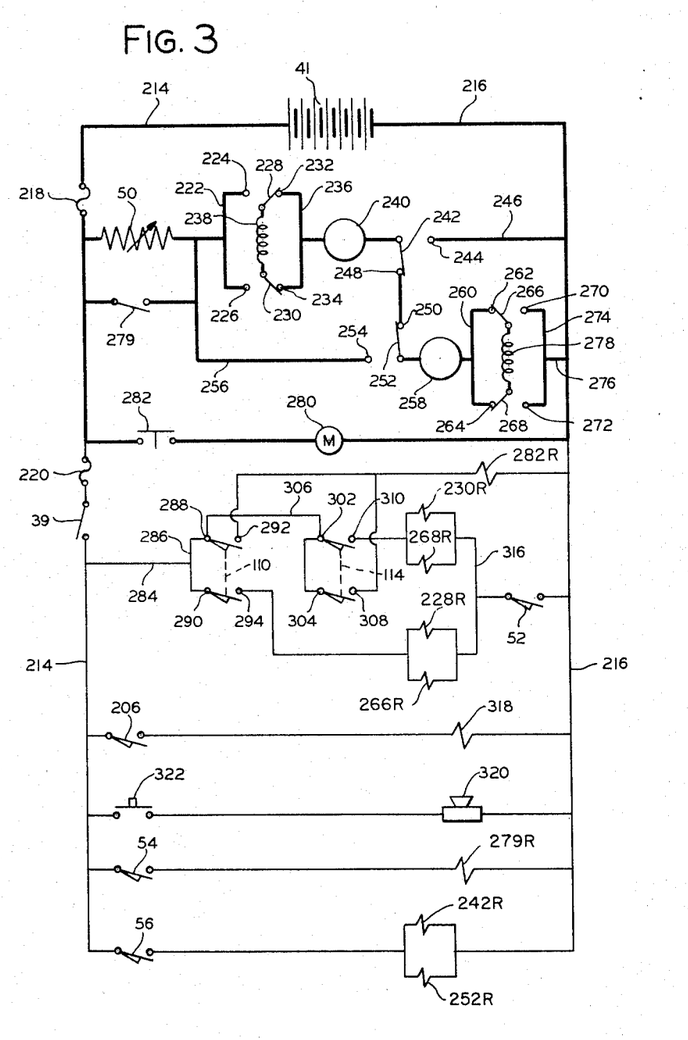
FIGURE 3 is a schematic showing of the electric circuitry of the truck embodying our invention.

Referring now to FIG. 3, the electric drive and control circuitry for truck 10 will be described. A pair of conductors 214 and 216 are connected to opposite terminals of battery 41. Connected in circuit in conductor 214 is a main fuse 218 of, for example, 400 amperes capacity, a control circuit fuse 220 of, for example, 14 amperes capacity and key operated on-off switch 39. Variable resistor 50 is connected at one end to conductor 214 and at the other end to a conductor 222 which connects switch 224 and 226 to two-position relay-actuated switches 228 and 230, respectively. Contacts 232 and 234 of switches 228 and 230 are connected by a common conductor 236. Also, the central terminals of switch 228 and 230 are connected to opposite ends of a motor field winding 238 of one of the drive motors. Connected to conductor 236 is a motor armature 240 associated with field winding 238.

Armature 240 also is connected to the common terminal of a series-parallel relay-actuated switch 242. A contact 244 of switch 242 is connected to conductor 216 by a conductor 246 and the other contact 248 of switch 242 is connected to a contact 250 of another series-parallel relay-actuated switch 252 which has a contact 254 connected by a conductor 256 to the side of variable resistor 50 opposite conductor 214. The common terminal of switch 252 is connected to the armature 258 of the other drive motor. Armature 258 is connected in turn to a conductor 260 which connects contacts 262 and 264 of a pair of two-position relay-actuated switches 266 and 268, respectively. Contacts 270 and 272 of switches 266 and 268 are connected to conductor 216 by conductors 274 and 276. The common terminals of switches 266 and 268 are connected to opposite ends of a motor field winding 278 associated with armature 258. Also, a normally-off relay-actuated switch 279 is connected in circuit between conductor 214 and conductor 256 in order to provide a circuit for by-passing variable resistor 50. The above-described circuitry enables the drive motors to be connected in circuit with battery 41 in either series or parallel relation for forward or reverse direction rotation, as will be described in more detail below.

Connected in circuit across conductors 214 and 216 is a motor 280 which drives a fluid pump, not shown, for supplying pressurized fluid to operate the power steering system of the truck. Operation of motor 280 is controlled by an on-off relay-actuated switch 282.

The control circuit for determining the forward and reverse travel direction of the truck includes a conductor 284 which is connected to conductor 214 and another conductor 286 which connects terminals 288 and 290 of switch 110. Switch 110 also includes a pair of contacts 292 and 294. Contact 292 is connected to one side of a relay coil 282R which serves to actuate switch 282 to close, coil 282R being connected at the other end thereof to conductor 216. Contact 294 is connected to one side of a pair of relay coils 228R and 266R connected in parallel to each other. Relay coil 228R actuates switch 228 to connect field winding 238 to contact 224, and similarly, relay coil 266R actuates switch 266 to connect one end of field winding 278 to contact 270 to condition both motors for forward drive.

Terminal 288 of switch 110 is connected in series relation to a pair of terminals 302 and 304 of switch 114 by means of a conductor 306. Switch 114 includes a pair of contacts 308 and 310. Contact 308 is connected in common with contact 292 to the same side of relay coil 282R which functions to close switch 282 as explained hereinabove. Contact 310 is connected to one side of a pair of relay coils 230R and 268R which are connected in parallel relationship and serve to actuate switches 230 and 268, respectively, so that one end of field winding 238 is connected to contact 226 and one end of field winding 278 is connected to contact 272. The ends of relay coils 228R, 266R, 230R and 268R opposite switches 110 and 114 are connected to a common conductor 316 which in turn is connected by switch 52 to conductor 216.

Also connected across conductors 214 and 216 in series with switch 206 is solenoid 318 for actuating valve 204. Another circuit connected between conductors 214 and 216 is the horn circuit and includes a horn 320 and a horn button 322 connected in series therewith. The horn button is conveniently located in the top of control handle 36 (see FIGS. 4 and 5).

The variable resistor by-pass control circuit includes a relay coil 279R connected in series with switch 54, the entire circuit being connected across conductors 214 and 216. Relay coil 279R when energized by closing the switch 54 serves to close switch 279, thus providing a circuit to by-pass variable resistor 50 for permitting the drive motors to operate at a higher speed.

A further speed increase is achieved through a series-parallel control circuit which includes a pair of relay coils 242R and 252R connected in parallel relation with each other and in series with switch 56, the entire circuit being connected across conductors 214 and 216. Energization of relay coil 242R causes switch 242 to connect armature 240 to contact 244. Similarly, energization of relay coil 252R causes switch 252 to connect armature 258 to contact 254. At this point it will be seen that with switches 242 and 252 in the latter condition the drive motors will be connected in parallel relationship and therefore operable at a higher speed than when connected in series as shown.

In order that our invention may be better understood we will now explain the operation of it. It will be assumed that truck 10 is parked, that it is desired to operate it in a forward direction at an increasing rate of speed and that switch 39 is on. The operator steps into the operator's station and depresses pedal 38 to actuate switch 206 to its on position which energizes solenoid 318 and causes valve 204 to move downwardly to a position blocking fluid flow through conduit 198. With the control system in a park condition, control handle 36 is in its leftmost position as shown in FIGS. 2 and 4 wherein it is held against the forward edge of bight portion 96 of the U-shaped opening in cover plate 94 by means of the bias exerted by springs 134 against dogs 142. Preferably, there is a detent at the center of the bight portion so that the control handle 36 may be easily located in a park position, in which condition master fluid actuator 42 is conditioned as shown in FIG. 2 wherein brakes 46 are applied by springs 186 as shown.

In order to drive truck 10 forwardly, it is first necessary to pivot control handle 36 to the right hand broken line position shown in FIG. 5. Movement of control handle 36 to this position brings leg 122 of left hand bar 120 into contact with actuator button 112 of switch 110 causing switch 110 to close contacts 292 and 294 to partially condition the forward drive control circuit for operation. It will be recalled that relay coils 228R and 266R are not energized to operate the drive motors until control handle 36 has been actuated to operate switch 52. It will be noted, however, that closing switch 110 energizes relay coil 282R which closes switch 282 to operate motor 280 which drives the pump to supply pressurized fluid to the power steering system. Thus, there is always lead time provided so that the steer pump operates first to generate the fluid pressure required to operate the power steering system before the truck 10 can be operated in forward or reverse. With control handle 36 in the right hand broken line position shown in FIG. 5, the operator may now either actuate the handle to the coast position indicated by line 146 or merely release the handle which permits the bias of compression springs 134 acting against dogs 142 to move it forwardly along leg 98 of the U-shaped opening in cover plate 94. In moving forwardly to the position indicated by line 146 control handle 36 passes through a brake release range. That is, piston 70 moves inwardly in bore 64 to generate sufficient fluid pressure to force pistons 176 outwardly against the bias of springs 186 until arms 180 abut stops 188 at which position brakes 146 are completely released. This position of control handle 36 establishes the coast condition of the control system. That is, the brakes 46 are completely released but the drive motors are not yet energized. Control handle 36 is held from self-volitional movement past the coast position by the resistance exerted by the bias of springs 158 of actuator 48 and of the fluid pressure actuated switches 52, 54 and 56 to any further fluid pressure increase in the control system.

In order to energize the drive motors to move truck 10 forwardly, control handle 36 is moved forwardly beyond the position indicated by line 146 which causes actuator 42 to increase the fluid pressure in the system. A relatively small increase in fluid pressure above that maintained by the control system to release brakes 46 will cause switch 52 to close. When switch 52 closes the forward direction control circuit is completed so that relay coils 228R and 268R are energized actuating switches 228 and 268 to close terminals 224 and 272, respectively, thereby connecting the drive motors in series for operation in a forward direction. However, in this condition spring 166 exerts such a small force on carbon pile 50 that circuit resistance is maintained at a level which provides insufficient current flow through the motors to overcome the inertia of the truck. Also, as control handle 36 is moved beyond the coast position, accumulator 58 begins to store pressure fluid so that substantial further forward movement of the control handle is permitted.

Forward movement of control handle 36 beyond the point at which switch 52 closes begins to actuate piston 152 against the bias of springs 158 which begins to compress carbon pile 50 to decrease circuit resistance and increase gradually the forward speed of the truck until carbon pile 50 is fully compressed. Thus, movement of control handle 36 through a predetermined arc results in an increasing circuit fluid pressure which provides an infinite variation in truck speed within the range of the carbon pile control. As explained previously, time delay unit 59 limits the rate at which the carbon pile can be compressed.

Further forward movement of control handle 36 beyond the point of full compression of carbon pile 50 generates additional fluid pressure at a controlled rate provided by unit 59 to close switch 54 which energizes relay coil 279R and closes switch 279, so that the motor drive circuit by-passes carbon pile 50 causing a further increase in motor and truck speed.

If it is desired to operate the truck at maximum speed, control handle 36 is moved an additional increment forward to generate a yet higher system fluid pressure, again at a controlled rate, which closes switch 56, energizes relay coils 242R and 252R, and actuates switches 242 and 252 to reconnect the drive motors in parallel, as described previously.

If the operator desires to stop truck 10, control handle 36 is actuated rearwardly with a resulting reversal of the foregoing steps; viz, the drive motors are first reconnected in series, switch 54 opens, and the carbon pile 50 is then reinserted in circuit with increasing resistance until the fluid pressure decreases to open switch 52 and thereby the drive motor circuit, whereupon the brakes are applied. Check valve 199 of time delay unit 59 permits system pressure to be decreased as rapidly as required for emergency stops, and the like, the rate of brake application from maximum truck speed depending only on the rate of rearward movement of control handle 36, as desired by the operator.

Assuming now that the operator desires to drive truck 10 in a reverse direction, control handle 36 is moved to the leftmost broken line position indicated in FIG. 5 in which leg 122 of right hand bar 120 engages actuator button 116 to close switch 114. Closure of switch 114 closes contacts 308 and 310 which energizes steer pump motor 280 and conditions the circuit for reverse drive motor operation following movement of the control handle forwardly in leg 100 of U-shaped cover plate 94 to close switch 52. Relay coils 230R and 266R are thus energized to actuate switches 230 and 266 to condition the drive motors for reverse operation. Otherwise, operation of the system in reverse drive is the same as described above in respect of forward drive operation.

If truck 10 is operating either in a forward or reverse direction and the operator, for example, desires to make an emergency stop or steps or falls from the truck, pedal 38 is returned to its elevated position by spring 210 with the result that switch 206 opens to de-energize solenoid 318 which opens valve 204, as shown, to connect actuators 44 directly with reservoir 66 by way of conduits 170, 172 and 198, and check valve 200. When this occurs the fluid pressure of the control system drops substantially immediately to a very low pressure value established by the spring load of check valve 200, with the result that all of the electric circuits open and the brakes 46 are applied forcefully and immediately.

From the above-description of the U-shaped movement required of control handle 36 in changing from one vehicle direction to another it will be seen that one important advantage of our control system lies in the unlikelihood of an operator being able to plug the drive motors; i.e., to energize the drive motors for rotation in a direction opposite to that in which the truck 10 is moving. It will be noted that in changing from one direction of truck movement to another it is necessary to first move the control handle rearwardly, then in a direction transverse of the truck, and finally in a forward direction. Clearly, it would be extremely difficult for an operator to unintentionally perform such a sequence of control handle movements rapidly enough to plug the drive motors under normal operating condition. A correlative advantage consequent to the difficulty of plugging the drive motor is that it is unnecessary to provide special anti-plug apparatus in our system other than time delay unit 59.

On the other hand, in special circumstances of operation, it is another advantage of our system that the operator can intentially plug the drive motors if necessary. For example, if the truck is proceeding down an incline and the brakes should fail, the operator can reverse the rotation of the motors to provide dynamic braking, thus slowing the truck and permitting the operator to retain control of its speed during further movement down the incline.

Although only one embodiment of our invention has been described herein, this disclosure is merely for purpose of illustration and not as a limitation of the scope of the invention. It is therefore to be expressly understood that the invention is not limited to the specific embodiment shown, but may be used in various other ways, and that various modifications may be made to suit different requirements, and that other changes, substitutions, additions and omissions may be made in the construction, arrangement and manner of operation of the parts without necessarily departing from the scope of the invention as defined in the following claims.

We claim:

1. For use in a vehicle having reversible motor means; a control system comprising means for connecting the motor means for operation in a forward direction including a forward direction control switch; means for connecting the motor means for operation in a reverse direction including a reverse direction control switch; fluid pressure generating means including a manually operable control handle, said handle being movable in a first direction to a position actuating said forward direction control switch so that connecting means for forward operation is conditioned to connect the motor means for forward operation and then movable in a second direction to generate fluid pressure, said handle being also movable in a third direction to a position actuating said reverse direction control switch so that said connecting means for reverse motor operation is conditioned to connect the motor means for reverse operation and then movable in said second direction to generate fluid pressure; fluid pressure conduit means connected to said fluid pressure generating means; and means connected to said conduit means and responsive to fluid pressure therein for varying the speed of the motor means.

2. For use in an industrial truck having normally-applied brake means and motor means; a control system comprising means for connecting the motor means for operation in a forward direction including a forward direction control switch and a fluid pressure responsive switch; means for connecting the motor means for operation in a reverse direction including a reverse direction control switch and said fluid pressure responsive switch; fluid pressure generating means including a manually operable control handle, said handle being movable selectively in a first direction to a position actuating said forward direction control switch so that said connecting means for forward motor means operation is conditioned to connect that motor means for forward operation or in a second direction to a position actuating said direction control switch so that said connecting means for reverse motor means operation is conditioned to connect the motor means for reverse operation and then movable from either of said positions in a third direction to generate fluid pressure; fluid pressure conduit means connected to said fluid pressure generating means; and means connected to said conduit means and responsive to a first fluid pressure for releasing the brake means; said fluid pressure responsive switch being connected to said conduit means and responsive to a second fluid pressure to energize said connecting means for forward motor operation when said forward direction control switch is actuated and to energize said connecting means for reverse motor means operation when said reverse direction control switch is actuated.

3. For use in an industrial truck having normally-applied brake means, a pair of electric drive motors connected normally in series circuit and variable resistor means for controlling current flow through the motors; a control system comprising means for connecting the motors for operation in a forward direction including a forward direction control switch and a first fluid pressure responsive switch; means for connecting the motors for operation in a reverse direction including a reverse direction control switch and said first fluid pressure responsive switch; fluid pressure generating means including a manually operable control handle, said handle being movable in a first direction to a position actuating said forward direction control switch so that said connecting means for forward motor operation is conditioned to connect the motors for forward operation and then movable in a second direction to generate fluid pressure, said handle being also movable in a third direction to a position actuating said reverse direction control switch so that said connecting means for reverse motor operation is conditioned to connect the motors for reverse operation and then movable in said second direction to generate fluid pressure; fluid pressure conduit means connected to said fluid pressure generating means; means connected to said conduit means and responsive to a first fluid pressure for releasing the brake means; said first fluid pressure responsive switch being connected to said conduit means and responsive to a second fluid pressure which is above said first fluid pressure to energize said connecting means for forward motor operation when said forward direction control switch is actuated and to energize said connecting means for reverse motor operation when said reverse direction control switch is actuated; actuator means connected to said conduit means and responsive to a range of increasing fluid pressure above said second fluid pressure for decreasing the resistance of the variable resistor means; means by-passing the variable resistor, said by-passing means including a second fluid pressure responsive switch connected to said conduit means and responsive to a third fluid pressure above said fluid pressure range to energize said by-passing means; and means for changing the connection of the motors from a series circuit to a parallel circuit, said circuit changing means including a third pressure responsive switch connected to said conduit means and responsive to a fourth fluid pressure above said third fluid pressure to energize said circuit changing means.

4. A control system as set forth in claim 3 and including means disposed in said conduit means for limiting the rate of fluid flow to said actuator means and said second and third fluid pressure responsive switches.

5. A control system as set forth in claim 4 and including a fluid pressure accumulator connected to said conduit means so that a substantial movement of the control handle is required to actuate all of the said switches and said actuator means.

6. A control system as set forth in claim 5 and including means for rendering said fluid pressure generating means ineffective to generate fluid pressure.

7. For use in an industrial truck having normally-applied brake means, a pair of electric drive motors connected normally in series circuit and variable resistor means for controlling the current to the motors; a control system comprising a forward motor direction control switch; a reverse motor direction control switch; a master fluid actuator having a cylinder, a fluid reservoir for supplying said cylinder with fluid and a piston slidably disposed in said cylinder for generating fluid pressure; a manually operable control handle operatively connected to said piston, said handle being movable in a first direction to actuate said forward motor direction control switch to condition the motors for forward drive and then movable in a second direction so that said piston is actuated to generate fluid pressure, said handle also being movable in a third direction to actuate said reverse motor direction control switch to condition the motors for reverse drive and then movable in said second direction so that said piston is actuated to generate fluid pressure; fluid conduit means connected to said cylinder; a fluid pressure accumulator connected to said fluid conduit means; first piston and cylinder type actuator means connected to said fluid conduit means, responsive to a first fluid pressure range and operable to gradually release the brake means; a first fluid pressure actuated switch connected to said fluid conduit means, responsive to a first fluid pressure and operable to energize the motors; second piston and cylinder type fluid actuator means connected to said fluid conduit means, responsive to a second fluid pressure range higher than said first fluid pressure range and operable to actuate the variable resistor means so that as the fluid pressure increases the resistance of the variable resistor means decreases; a second fluid pressure actuated switch connected to said fluid conduit means, responsive to a second fluid pressure and operable to close a circuit by-passing the variable resistor; and a third fluid pressure actuated switch connected to said fluid conduit means, erspsonsive to a third fluid pressure and operable to complete a circuit connecting the motors in parallel circuit rather than in series circuit.

8. A control system as set forth in claim 7 and including fluid conduit means connecting said first-mentioned fluid conduit means and said reservoir, a normally-open solenoid actuated on-off valve disposed in said second-mentioned fluid conduit means, and operator controlled switch means for energizing said solenoid actuated valve to close.

9. A fluid pressure generating means and control handle assembly comprising support means, fluid pressure generating means connected to said support means for pivotal movement about a first axis, a control handle for actuating said generating means to generate fluid pressure, said control handle being connected to said generating means for pivotal movement about a second axis, and a pair of control elements disposed such that pivotal movement of said generating means to a first position actuates one of said control elements and pivotal movement of said generating means in the opposite direction to a second position actuates the other of said control elements.

10. An assembly as set forth in claim 9 wherein said second axis is substantially transverse to said first axis and said control elements are switches.

11. A fluid pressure generating and control handle assembly comprising support means, fluid pressure generating means connected to said support means for pivotal movement about a first axis, a control handle connected to said generating means for pivoting said generating means about said first axis, said control handle being also connected to said generating means for pivotal movement about a second axis for actuating said generating means to generate fluid pressure, and a pair of switch means disposed with said first axis located intermediate thereof so that pivotal movement of said control handle about said first axis to a first position causes actuation of one of said switch means and pivotal movement of said handle in the opposite direction about said first axis to a second position causes actuation of the other of said switch means.

12. An assembly as set forth in claim 11 and including switch actuating means connected to said generating means, said switch actuating means including a pair of bars which are resiliently connected to opposite sides of said generating means and extend outwardly therefrom along an axis generally transverse to said first axis.

13. A fluid actuator and control handle assembly comprising support means, a fluid actuator having a body connected to said support means for pivotal movement about a first axis, said body including a bore therein which extends substantially parallel to said first axis, a piston slidably disposed in said bore for reciprocal movement therein and a piston rod connected to said piston, said piston rod extending outwardly through said body, a control handle connected to said body for pivotal movement about a second axis which is at substantially right angles to said first axis, said handle being operatively connected to said piston rod so that pivotal movement of said handle about said second axis effects movement of said piston along said bore, a pair of switch actuating means connected to said body, and a pair of switch means connected to said support means and arranged to be actuated by respective ones of said switch actuating means so that pivotal movement of said body in one direction to a predetermined position actuates one of said switch means and pivotal movement of said body in the opposite direction to a predetermined position actuates the other of said switch means.

14. A fluid pressure generating and control handle assembly comprising support means, a pair of switches connected to said support means, fluid pressure generating means connected to said support means, and a control handle connected to said generating means, said handle being pivotal about a first axis to selectively actuate one or the other of said switches and pivotal about a second axis to generate fluid pressure.

References Cited by the Examiner

UNITED STATES PATENTS

| 1,245,739 | 10/1917 | Simmon et al. | 192—2 |
| 2,330,739 | 9/1943 | Piron | 60—52 X |
| 2,658,174 | 11/1953 | Warrick | 318—111 X |
| 2,789,542 | 9/1957 | Vander Kaay | 60—53 X |
| 2,903,852 | 9/1959 | Bottoms | 60—53 |
| 3,179,198 | 4/1965 | Hastings | 192—2 X |
| 3,187,285 | 6/1965 | Dawson | 318—395 X |

FOREIGN PATENTS 521,054    5/1940    Great Britain.

ORIS L. RADER, *Primary Examiner.*

J. C. BERENZWEIG, *Assistant Examiner.*